(12) United States Patent
Yamaguchi

(10) Patent No.: US 6,527,410 B2
(45) Date of Patent: Mar. 4, 2003

(54) ILLUMINATING DEVICE AND LIQUID-CRYSTAL DISPLAY APPARATUS

(75) Inventor: Akira Yamaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/773,771

(22) Filed: Feb. 2, 2001

(65) Prior Publication Data

US 2001/0017674 A1 Aug. 30, 2001

(30) Foreign Application Priority Data

Feb. 2, 2000 (JP) ........................................ 2000-024942

(51) Int. Cl.[7] .............................................. F21V 13/00
(52) U.S. Cl. ...................... 362/243; 362/242; 362/246; 349/64; 349/66
(58) Field of Search ................................ 362/242, 243, 362/246; 349/61, 62, 64, 66, 70, 42

(56) References Cited

U.S. PATENT DOCUMENTS 5,459,592 A * 10/1995 Shibatani et al. ............. 359/40
6,152,580 A * 11/2000 Babuka et al. ............... 362/330

FOREIGN PATENT DOCUMENTS

| JP | 5-333202 | 12/1973 | ............. G02B/5/02 |
| JP | 7-5306 | 1/1995 | ............. G02B/5/02 |

* cited by examiner

Primary Examiner—Sandra O'Shea
Assistant Examiner—Guiyoung Lee
(74) Attorney, Agent, or Firm—Sughrue Mion, PLLC

(57) ABSTRACT

The illuminating device includes light sources, a housing of the light sources that has its inner surfaces covered with a diffuse reflecting layer, an optical collimator for collimating the light issued from the light sources and the light reflected by the diffuse reflecting layer, and a directivity regulating member for regulating the directivity of the collimated light emerging from the optical collimator. The liquid-crystal display apparatus has a liquid-crystal display panel and the illuminating device. The illuminating device can emit collimated light of very high directivity and may be utilized in the liquid-crystal display apparatus to display images of high quality and contrast over a wide range of viewing angles.

9 Claims, 3 Drawing Sheets

ILLUMINATING DEVICE AND LIQUID-CRYSTAL DISPLAY APPARATUS

BACKGROUND OF THE INVENTION

This invention relates to the technology of an illuminating device and a liquid-crystal display apparatus, more particularly, to an illuminating device for use in a liquid-crystal display apparatus that is capable of producing high-contrast image over a wide range of viewing angles, as well as a liquid-crystal display apparatus that makes use of the illuminating device.

The use of liquid-crystal displays (LCDs) as a display for word processors and computers is rapidly increasing today. The use of LCDs as a monitor in ultrasonic, CT and MRI diagnostic apparatus is under review. Conventionally, these medical diagnostic apparatus have primarily used CRTs (cathode-ray tubes) as a monitor.

LCDs have many advantages such as ease in size reduction, small thickness and lightweightness. On the other hand, they have poor viewing angle characteristics (narrow viewing angle) since as the viewing direction or angle changes, the contrast of an image decreases sharply and the gradation also reverses to have the image look differently. As a result, depending on the position of the viewer, the image cannot be viewed correctly.

In the medical applications described above, correct viewing of images is important particularly for preventing wrong diagnosis. What is more, diagnosis based on the difference in image density requires that images of high contrast ratio be displayed over a wide range of viewing angles. Another problem peculiar to medical monitors is that image is usually displayed in monochrome (black and white colors) and, hence, suffers considerable drop in contrast as the viewing angle varies.

A known method for increasing the viewing angle of LCDs relies upon using collimated backlight and the image-bearing light that has passed through the liquid-crystal display panel is diffused with a diffusing plate. This method increases the viewing angle of the liquid-crystal display and enables the fabrication of an LCD that produces high-contrast image display over a wide range of viewing angles.

This method has the advantage that the higher the directivity of collimated light, the wider the viewing angle that can be offered. On the other hand, if the performance of the optical collimator used is so low that collimated light having adequate directivity cannot be launched into the liquid-crystal display panel, the desired viewing angle cannot be produced.

In addition, uneven display and blurred images often occur if the directivity of collimated light is low. Since incorrect recognition of an image can cause wrong diagnosis or inconsistency in the results -of diagnosis, the uneven display and blurred images are particularly serious problems in the medical applications.

SUMMARY OF THE INVENTION

The present invention has been accomplished under these circumstances and has as a primary object providing an illuminating device that can emit collimated light of very high directivity and which, if combined with a light diffusing plate in a liquid-crystal display apparatus, can produce a wide range of viewing angles and which yet can display high-quality images without unevenness and blur that would otherwise result if a collimator of low performance were used to produce collimated light of low directivity.

Another object of the invention is to provide a liquid-crystal display apparatus that makes use of the illuminating device and can display high-quality images free from unevenness and blurring with high contrast over a wide range of viewing angles.

In order to attain the primary object described above, the present invention provides an illuminating device comprising light sources, a housing of the light sources that has its inner surfaces-covered with a diffuse reflecting layer, an optical collimator for collimating light issued from the light sources and the light reflected by the diffuse reflecting layer, and a directivity regulating member for regulating directivity of the collimated light emerging from the optical collimator.

Preferable, the directivity regulating member has a plurality of optical paths through which the light passes and anti-reflection layers that absorb the light incident on wall surfaces of the optical paths.

Preferably the following relation is satisfied:

$$p/\tan \theta \leq La$$

where p is a pitch of emergence of the collimated light from the optical collimator, $\theta$ is a divergence angle of the collimated light emerging from the optical collimator, and La is a distance from the optical collimator to the directivity regulating member.

In order to attain another object described above, the present invention provides a liquid-crystal display apparatus comprising a liquid-crystal display panel; and an illuminating device including light sources, a housing of the light sources that has its inner surfaces covered with a diffuse reflecting layer, an optical collimator for collimating light issued from the light sources and the light reflected by the diffuse reflecting layer, and a directivity regulating member for regulating directivity of the collimated light emerging from the optical collimator.

Preferably, the directivity regulating member has a plurality of optical paths through which the light passes and anti-reflection layers that absorb the light incident on wall surfaces of the optical paths.

Preferably, the following relation is satisfied:

$$p/\tan \theta \leq La$$

where p is a pitch of emergence of the collimated light from the optical collimator, $\theta$ is a divergence angle of the collimated light emerging from the optical collimator, and La is a distance from the optical collimator to the directivity regulating member.

It is also preferable that the liquid-crystal display apparatus further comprises a light diffusing plate for diffusing image-bearing light that has pass ed through the liquid-crystal display panel.

Preferably, the following relation is satisfied:

$$q/\tan \phi \leq Lb$$

where q is a pitch of emergence of the collimated light from the illuminating device, $\phi$ is a divergence angle of the collimated light emerging from the illuminating device, and Lb is a distance from the illuminating device to a liquid-crystal layer of the liquid-crystal display panel.

DESCRIPTION OF THE PREFERRED EMBODIMENT

We now describe the illuminating device and the liquid-crystal display apparatus of the invention in detail with reference to the preferred embodiment depicted in the attached drawings.

Figure 1:
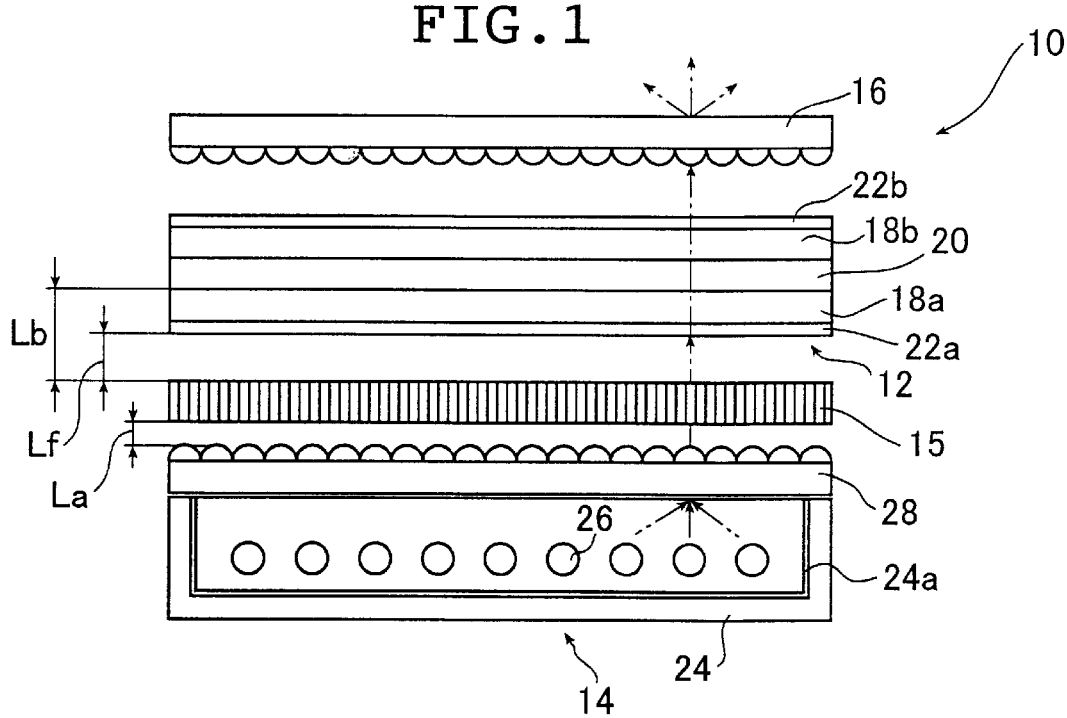
FIG. 1 shows an embodiment of a liquid-crystal display apparatus of the invention in conceptual form.

FIG. 1 shows in conceptual form an embodiment of the liquid-crystal display apparatus of the invention which makes use of the illuminating device of the invention. The liquid-crystal display apparatus (hereinafter referred to simply as "display apparatus") generally indicated by 10 in FIG. 1 is a so-called liquid-crystal display (hereunder referred to as LCD) that utilizes a liquid-crystal display panel 12 as an image display device. It is composed of the liquid-crystal display panel 12, a backlight section 14 that causes collimated light to be incident on the liquid-crystal display panel 12, a directivity regulating member 15 which is characteristic of the invention and which regulates the directivity of collimated light, and a light diffusing plate 16 that diffuses the image-bearing light that has passed through the liquid-crystal display panel 12. In the display apparatus 10, the illuminating device of the invention is composed of the backlight section 14 and the directivity regulating member 15.

In the illustrated case, the liquid-crystal display panel 12 is connected to its driver (not shown). The display apparatus 10 and the illuminating device of the invention are combined with any necessary members that are included in known LCDs, such as a casing that has an image viewing window and which holds the backlight section 14, directivity regulating member 15, liquid-crystal display panel 12, light diffusing plate 16, the driver and other members in position.

As in the conventional transmission LCD, the collimated backlight that has been issued from the backlight section 14 and which has its directivity enhanced by the directivity regulating member 15 is launched into the liquid-crystal display panel 12 being driven in accordance with the image to be displayed and as it passes through the panel 12, the collimated backlight bears the image and is diffused by the light diffusing plate 16 to produce image display for the viewer.

The backlight section 14 emits collimated light that serves as backlight for enabling the viewing of the image being displayed by liquid-crystal panel 12. To issue collimated light, the backlight section 14 comprises a housing 24, light sources 26 and a light collimating plate 28.

The housing 24 is a rectangular enclosure with one side open and its inner surfaces are covered with a diffuse reflecting layer 24a that reflects the incident light by diffusion. This design allows for efficient use of the light from the light sources 26 to produce intense collimated light. The diffuse reflecting layer 24a is not limited in any particular way and various known types can be used as exemplified by one that is formed of a dispersion of the fine particles of light diffusing materials such as alumina ($Al_2O_3$) and titanium oxide ($TiO_2$)

The housing 24 has the light sources 26 in its interior. All known types of light sources that are used in the so-called transmission LCDs can be used as the light sources 26 as long as they emit adequate quantities of light.

The light collimating plate 28 condenses the light issued from the light sources 26, as well as the light reflected by the inner surfaces (the diffuse reflecting layer 24a) of the housing 24 and it emits collimated light. Having this capability, the collimating plate 28 is placed to close the opening of the housing 24.

The light collimating-plate to be used in the invention is not limited in any particular way and various known types of collimating plates may be used, as exemplified by a collimating plate consisting of two crossed prism sheets and a collimating plate using a louver that transmits only part of scattered light.

Figure 2:
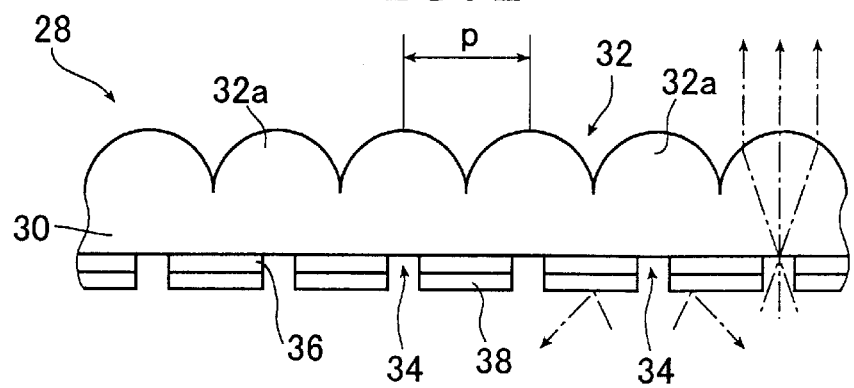
FIG. 2 shows in conceptual form an embodiment of a light collimating plate used in the liquid-crystal display apparatus of FIG. 1.

A preferred embodiment of the light collimating plate 28 is shown schematically in FIG. 2. It comprises a lens substrate 30 in plate form having a microlens array (hereunder referred to as a lens array) 32 formed on one side as a two-dimensional arrangement of hemispherical microlenses 32a. The side of the lens substrate 30 away from the lens array 32 is entirely covered with a light shield layer 36 except in light entrance areas 34 that are set on-axis or in alignment with the optical axes of the microlenses 32a. The side of the lens substrate 30 which is closer to the incoming light than the shield layer 36 (which in the illustrated case is on top of the shield layer 36 with the lens substrate 30 taken as a base) is entirely covered with a diffuse reflecting layer 38 except in the light entrance areas 34.

The collimating plate 28 is fixed on the housing 24 with the lens array side facing the liquid-crystal panel 12.

The light emerging from the housing 24 as indicated by the one-long-one-short dashed lines in FIG. 2 is launched into the lens substrate 30 via the light entrance areas 34, passes through it to be launched into the microlenses 32a, refracted and emitted as collimated light.

The light incident other than in the light entrance areas 34 is reflected by the diffuse reflecting layer 38 to go back into the housing 24, where it is reflected to make another entry into the collimating plate 28, thus increasing the efficiency of light utilization. Any light passing through the diffuse reflecting layer 38 is blocked by the shield layer 36 and no stray light will occur that can reduce the directivity of the collimated light.

The constituent materials of the lens substrate 30 and the lens array 32 in the collimating plate 28 are not limited in any particular way and various kinds of lens materials may be used as exemplified by glass and various optical resins. The lens substrate 30 and the lens array 32 may be molded monolithically or they may be separate members that are fixed in combination.

The microlenses 32a need not be hemispherical and they may advantageously take on a shape produced by cutting an ellipsoid (of revolution) through a plane perpendicular to its major axis.

The diffuse reflecting layer 38 and the shield layer 36 also are not limited in any particular way and various known types may be used. For example, the diffuse reflecting layer 38 may be made of the same material as exemplified for the diffuse reflecting layer 24a of the inner surfaces of the housing 24 and the shield layer 36 may be made of chromium (Cr) which is used in a BM (black matrix) of the liquid-crystal panel 12.

The methods of forming the diffuse reflecting layer 38 and the shield layer 36 are not limited, either, and they may be formed by any known methods such as thin-film forming techniques (e.g. vapor deposition) and printing, the choice of which depends on constituent materials and other factors.

Another preferred embodiment of the collimating plate 28 is one that replaces the hemispherical microlenses 32a with a number of light-transmissive spherical beads that are fixed in one layer on a transparent base sheet in such a way that they partly contact the base sheet.

The collimated light issued from the backlight section 14 is then launched into the directivity regulating member 15.

As is well known, no optical collimators can produce perfectly parallel light and any collimated light issued from the backlight section 14 has a certain divergence angle ($\theta$) that varies with the performance of the light collimating plate 28. The directivity regulating member 15 rejects (blocks) any unwanted diffusing components of the collimated light from the light collimating plate 28 and transmits only the components of high directivity, thereby producing collimated light of higher directivity.

Figure 3A:
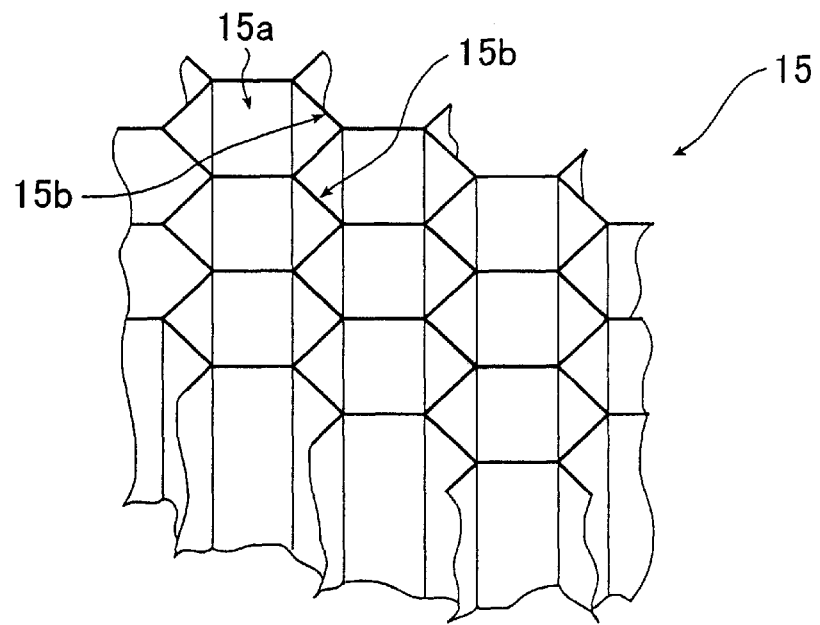
FIG. 3A is a perspective view showing schematically an embodiment of a directivity regulating member for use in the liquid-crystal display apparatus of FIG. 1.

The directivity regulating member 15 preferably has a multiple of optical paths 15a for the collimated light and anti-reflection layers 15b that absorb the light incident on the lateral sides of the optical paths. An embodiment of the directivity regulating member 15 is a honeycomb structure which, as shown in FIG. 3A, consists of hexagonal tubes that are open on both top and bottom sides to serve as the optical paths 15a and which each have six side walls that serve as the anti-reflection layers 15b.

Figure 3B:
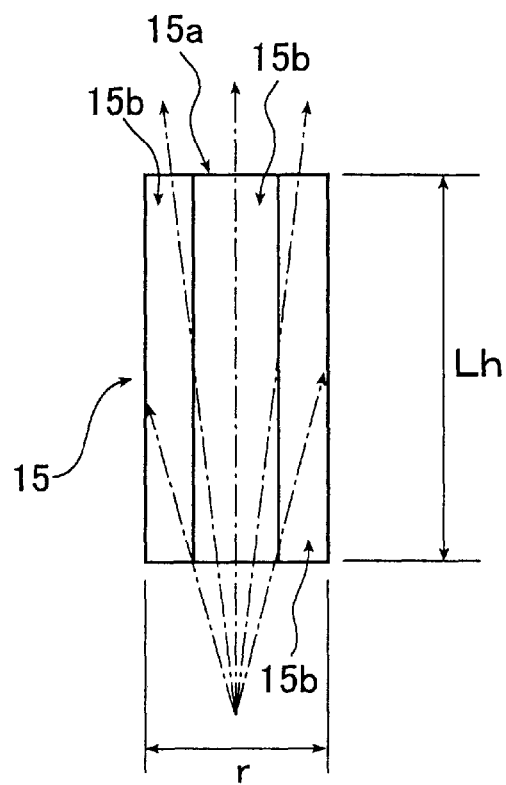
FIG. 3B shows in conceptual form how the directivity regulating member works.

As shown schematically in FIG. 3B, only the high-directional components of the incident collimated light can pass through the directivity regulating member 15 and the diffusing components which-have-low directivity are absorbed by the non-reflecting side walls (the anti-reflection layers 15b) upon falling on them. As a result, the collimated light emerging from the directivity regulating member 15 has very high directivity (small divergence angle).

As already mentioned, for LCDs using collimated backlight, an increased directivity of the collimated light contributes to increasing the range of viewing angles whereas uneven display and blurred images occur if it does not have adequate directivity.

Since the display apparatus 10 (or the illuminating device) of the present invention uses the above-described directivity regulating member 15, it can launch collimated light of very high directivity into the liquid-crystal display panel 12. Combining the directivity regulating member 15 with a light diffusing plate (e.g. light diffusing plate 16), the display apparatus 10 can offer a wide range of viewing angles; in addition, it is free from the uneven display and blurred images that would otherwise occur if the collimated light did not have adequate directivity.

In the present invention, the light collimating plate (optical collimator) 28 is combined with the directivity regulating member 15, so that optical loss is minimized to produce highly directional collimated light.

The directivity regulating member 15 alone may be sufficient to produce collimated light of the same divergence angle. However, uncollimated diffusing light has an intensity distribution that follows the cosine law, so if its diffusing components are rejected by the directivity regulating member 15, most of the light issued from the light sources will be rejected to cause considerable drop in the efficiency of light utilization.

In the present invention, the light issued from the light sources is collimated (regulated) by the collimator 28 and the resulting collimated light is further regulated by the directivity regulating member 15. As a result, compared to the case where no collimator is used, the amount of the diffusing light components to be blocked by the directivity regulating member 15 can be significantly reduced and the light issued from the light sources 26 can be efficiently utilized to produce highly directional collimated light.

Further discussing the directivity regulating member 15, the directivity of the collimated light to emerge from the directivity regulating member 15, or the divergence angle ($\phi$) of the emerging collimated light, can be regulated by adjusting the size of the optical path 15a for the collimated light (as measured in a direction perpendicular to the optical axis) and its length (along the optical axis). Suppose the optical path 15a having a maximum size of r and the length of Lh. Light that diffuses at an angle greater than $\tan^{-1}$ (r/Lh) with respect to the optical axis cannot pass through the directivity regulating member 15. If the values of r and Lh are 1 mm and 5.67 mm, respectively, light that diffuses at an angle greater than 10° with respect to the optical axis cannot pass through the directivity regulating member 15. Therefore, the collimated light emerging from the directivity regulating member 15 has a divergence angle not wider than 10°.

The values of r and Lh of the directivity regulating member 15 may be determined as appropriate for various factors such as the size of the display apparatus 10, the desired image quality, the directivity (divergence angle) required of the collimated light and the efficiency of light utilization (its brightness).

For the purposes of the invention, the directivity regulating member 15 is in no way limited to the honeycomb structure having the anti-reflection layer 15b formed on the side walls of the cells and various other structures may be employed. For example, a number of rectangular or equilateral triangular tubes, rather than hexagonal tubes, that have an anti-reflection layer on their side walls may be assembled as in a honeycomb and the resulting structures can advantageously be used as the directivity regulating member. Also useful is a large bundle of cylindrical or otherwise shaped tubes having an anti-reflection layer on both the inner and outer surfaces of their side walls. In this structure, the spaces between adjacent tubes can also serve as optical paths. Alternatively, a number of straight through-holes are formed in a plate member and an anti-reflection layer is formed on their inner surfaces and this structure can also be used as the directivity regulating member 15.

These structures including the honeycomb may be fabricated from known materials including metals (e.g. aluminum) and various resin materials by known methods that suit the materials used.

Yet another embodiment of the directivity regulating member 15 is a large bundle of straight light propagating materials (e.g. glass fibers or optical fibers) that have an anti-reflection layer formed on their outer surfaces.

The method of forming the anti-reflection layer in the directivity regulating member 15 also is not limited in any particular way and various known methods can be employed, as exemplified by the application of a dispersion of carbon black particles. Alternatively, the directivity regulating member 15 itself may be formed of a non-reflecting material so that their side walls serve as the non-reflection layer.

Figure 4A:
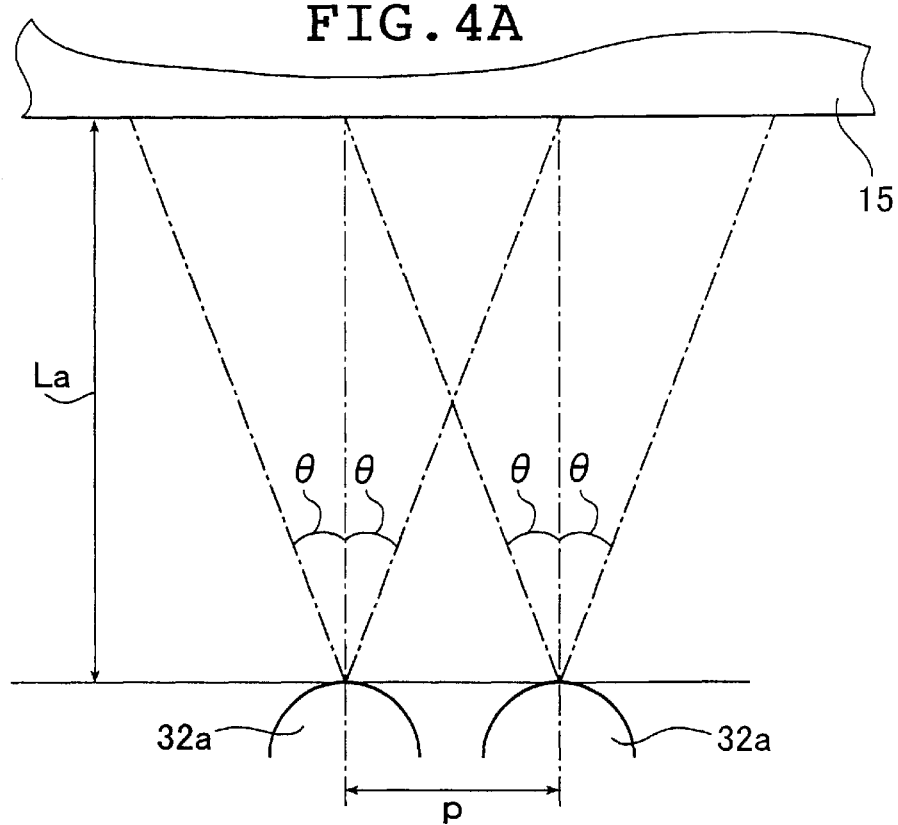
FIGS. 4A and 4B are conceptual diagrams for illustrating the liquid-crystal display apparatus of FIG. 1.

If, as shown in FIG. 4A, the (average) pitch of emergence of collimated light from the collimating plate 28 (which in the illustrated case is the distance between the optical axes of adjacent microlenses 32a) is written as p, the divergence angle of the collimated light as θ and the distance from the collimating plate 28 (the surface of the microlens array 32) to the directivity regulating member 15 (its light entrance face) as La, the display apparatus 10 (or the illuminating device) of the invention is preferably designed such that the collimated light, collimating plate 28 and the directivity regulating member 15 satisfy the relation p/tan θ≦La.

As mentioned earlier, any collimated light has a certain divergence angle θ that varies with the performance of the collimating plate 28 and, hence, its quantity is distributed from the optical axis outward. As a result, depending upon the characteristics of the collimating plate 28 and the directivity regulating member 15, the light being launched into the directivity regulating member 15 becomes nonuniform in intensity due to the distribution of its quantity and this may potentially cause adverse effects on the image to be displayed.

In the present invention, the collimated light, collimating plate 28 and the directivity regulating member 15 satisfy the relation p/tan θ≦La, so neighboring beams of the collimated light being launched into the directivity regulating member 15 overlap each other by an amount at least equal to one half the pitch p (see FIG. 4A). As a result, the collimated light launched into the directivity regulating member 15 is averaged to eliminate any unevenness in quantity (intensity), thus enabling the display of a higher-quality image.

For the purposes of the present invention, the divergence angle θ (and the divergence angle φ to be described later) of the collimated light is defined by the half-peak width of the directional characteristics of the collimated light. More specifically, the divergence angle θ is the angle the optical axis forms with the position where the quantity of light on the optical axis is halved.

As already mentioned, the collimated light emerging from the collimating plate 28 of the backlight section 14 is enhanced in directivity by passage through the directivity regulating member 15 and then launched into the liquid-crystal display panel 12 as collimated backlight for assisting in the viewing of the image being displayed by LCD.

In the display apparatus 10 of the invention, the liquid-crystal display panel 12 (hereunder referred to simply as the display panel 12) may be a known liquid-crystal display panel used in various kinds of LCDs. In the illustrated case, the display panel 12 has a liquid-crystal layer 20 sandwiched between two glass substrates 18a and 18b, with a polarizer plates 22a and 22b provided on the face of the respective glass substrates 18a and 18b away from the liquid-crystal layer 20. Various kinds of optical compensating filters (e.g. a phase compensating filter) and the like may optionally be provided between the glass substrate 18a and 18b and the polarizer plate 22a and 22b, respectively.

The display panel 12 may therefore be of a full-color or monochromatic type and has no limitations on the type of liquid crystal, liquid-crystal cell, drive means (switching device) such as a TFF (thin-film transistor) and black matrix (BM).

The display panel 12 may be operated in all known modes including a TN (twisted nematic) mode, an STN (supertwisted nematic) mode, an ECB (electrically controlled birefringence) mode, an IPS (in-plane switching) mode and an MVA (multi-domain vertical alignment) mode.

In order that the display apparatus 10 of the invention is also suitable for use as a medical monitor, the pixel size of the display panel 12 is preferably no more than 200 μm, assuming that one pixel in the invention is made up of R, G and B sub-pixels if the apparatus is of a full-color type. Preferably, the display panel 12 is monochromatic.

Figure 4B:
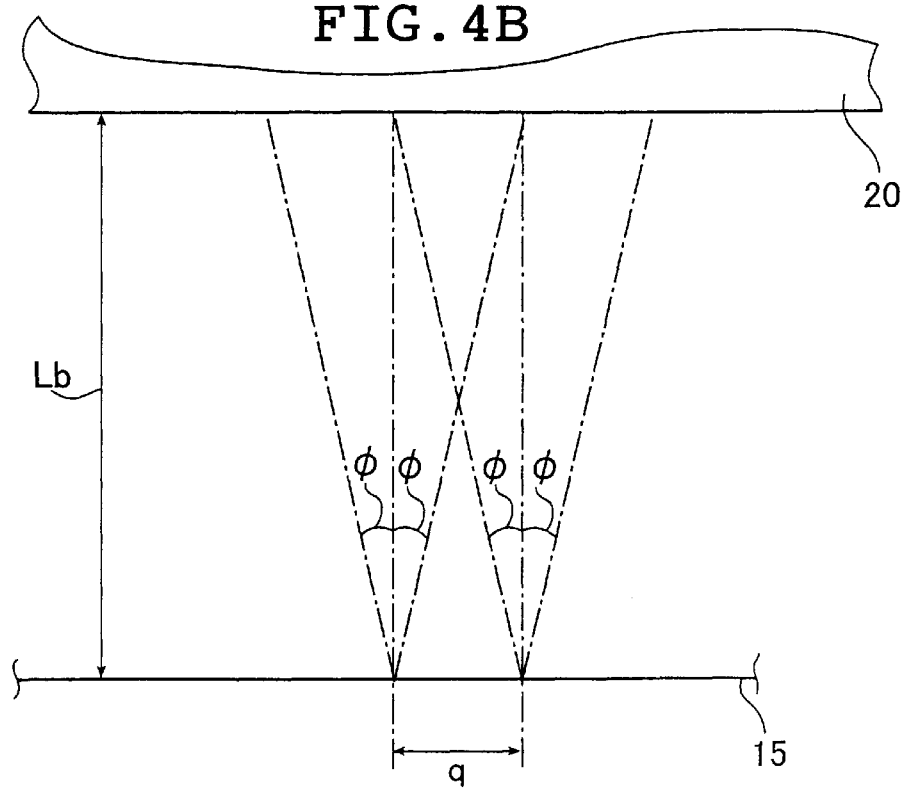

If, as shown schematically in FIG. 4B, the (average) pitch of emergence of collimated light from the directivity regulating member 15 (which in the illustrated case is the distance between the centers of adjacent hexagonal tubes) is written as q, the divergence-angle of the collimated light emerging from the directivity regulating member 15 as φ and the distance from the directivity regulating member 15 (its light exit face) to the liquid-crystal layer 20 (the interface with the glass substrate 18a) as Lb, the display apparatus 10 of the invention is preferably designed such that the collimated light, directivity regulating member 15 and the display panel 12 satisfy the relation p/tan φ≦Lb.

As already mentioned, the display apparatus 10 of the invention has the directivity regulating member 15 and can hence display images using collimated backlight of very high directivity. However, even the highly directional collimated light emerging from the directivity regulating member 15 has a certain divergence angle φ and its quantity is distributed from the optical axis outward. As a result, the image being displayed may be adversely affected by the distribution (unevenness) in the quantity of collimated light. Particularly in the case where the pitch p of the collimated light is greater than the pixel size of the display panel 12, the unevenness in the quantity of collimated light appears directly in the displayed image to produce an uneven display.

According to the study of the present inventors, if neighboring beams of the collimated light incident on the liquid-crystal layer 20 overlap each other by an amount at least equal to one half the pitch p (see FIG. 4B), the collimated light incident on the liquid-crystal layer 20 is averaged to eliminate any unevenness in quantity and, hence, the resulting unevenness in display is prevented to ensure the display of a high-quality image.

In the present invention, the collimated light, directivity regulating member 15 and the display panel 12 (in particular, the liquid-crystal layer 20) satisfy the relation q/tan φ≦Lb and given this design, adjacent beams of the collimated light incident on the display layer 20 overlap each other by an amount at least equal to one half the pitch p and, as a result, a high-quality image can be displayed without any unevenness.

In its preferred embodiment, the invention also satisfies the relation q/tan φ≦Lf, where Lf is the distance between the directivity regulating member 15 and the outermost surface of the liquid-crystal panel 12 which faces the collimating plate 28 (which in the illustrated case is the side of the polarizer plate 22a which faces the collimating plate 28). If this condition is met, the collimated light entering the polarizer plate 22a and any optical compensating filter that is optionally inserted in the liquid-crystal panel 12 is also averaged to eliminate any unevenness in quantity and, as a result, uneven display is prevented in a more efficient and positive way to enable the display of an image of even higher quality.

As already mentioned, the collimated light issued from the backlight section 14 is launched into the display panel 12 being driven in accordance with the image to be displayed and as it passes through the panel 12, the collimated backlight bears the image and is diffused by the diffusing plate 16 to produce image display to the viewer. It has also been mentioned that one can increase the range of viewing angles of an LCD by using collimated backlight and diffusing the image-bearing light from the display panel 12 by means of the light diffusing plate 16.

The light diffusing plate 16 to be used in the display apparatus 10 of the invention is not limited in particular way and various known types of light diffusing plates (sheets) can be used, as exemplified by a light diffusing plate having a transparent electroconductive layer between a transparent base and a light diffusing layer and which is disclosed in Unexamined Published Japanese Patent Application (kokai) No. 333202/1993, and a light diffusing plate in which a layer of crosslinked ion-conductive resin having a cationic quaternary ammonium base at side chains is provided between a transparent base and a light diffusing layer, as disclosed in Unexamined Published Japanese Patent Application No. 5306/1995.

Figure 5:
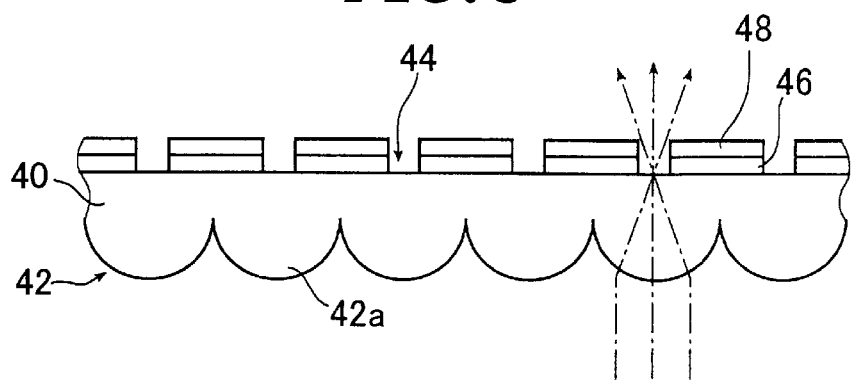
FIG. 5 shows in conceptual form an embodiment of a light diffusing plate for use in the liquid-crystal display apparatus of FIG. 1.

In a preferred embodiment, the illustrated display apparatus 10 uses a light diffusing plate 16 shown schematically in FIG. 5. It comprises a lens substrate 40 in plate form having a microlens array (hereunder referred to as a lens array) 42 formed on one side as a two-dimensional arrangement of hemispherical microlenses 42a. The side of the lens substrate 40 away from the lens array 42 is entirely covered with a light shield layer 46 except in light exit areas 44 that are set on-axis or in alignment with the optical axes of the microlenses 42a. The side of the lens substrate 40 which is closer to the viewer's eyes than the shield layer 46 is entirely covered with an anti-reflection (AR) layer 48 except in the light exit areas 44.

As is clear from FIGS. 2 and 5, the light diffusing plate 16 has basically the same construction as the aforementioned collimating plate 28 except that the diffuse reflecting layer 38 is replaced by the anti-reflection layer 48.

The light diffusing plate 16 is fixed on the housing with the lens array side facing the display panel 12. The light diffusing plate 16 works in a way just opposite to the aforementioned collimating plate 28; the image-bearing collimated light emerging from the display panel 12 is launched into the microlenses 42a, where it is diffused by refraction and thence issued from the light exit areas 44 as diffuse light. Any stray light that is incident other than in the light exit areas 44 is blocked by the shield layer 46 and there will be no interference with image viewing.

FIG. 5 shows the preferred case where the anti-reflection layer 48 is formed on the viewing side of the light diffusing plate 16 and this ensures the viewing of satisfactory image. The anti-reflection layer 48 is not limited in any particular way and various known types of anti-reflection layer can be used.

While the illuminating device and the liquid-crystal display apparatus of the invention have been described above in detail with reference to various embodiments, it should be understood that the invention is by no means limited to the foregoing embodiments alone and various improvements and design modifications may of course be made without departing from the scope and spirit of the invention.

As will be understood from the foregoing description, the illuminating device of the invention can emit collimated light of very high directivity. Using this illuminating device, the liquid-crystal display apparatus of the invention effectively combines the highly directional collimated backlight with the light diffusing plate to offer a wide range of viewing angles while realizing a display of high-quality images without any unevenness and blur that would otherwise occur if the low directivity of the collimated light was low.

What is claimed is:

1. An illuminating device comprising light sources, a housing of said light sources that has its inner surfaces covered with a diffuse reflecting layer, an optical collimator for collimating light issued from said light sources and the light reflected by the diffuse reflecting layer, and a directivity regulating member for regulating directivity of the collimated light emerging from said optical collimator.

2. The illuminating device according to claim 1, wherein said directivity regulating member has a plurality of optical paths through which the light passes and anti-reflection layers that absorb the light incident on wall surfaces of said optical paths.

3. The illuminating device according to claim 1, wherein the following relation is satisfied:

$$p/\tan \theta \leq La$$

where p is a pitch of emergence of the collimated light from said optical collimator, θ is a divergence angle of the collimated light emerging from said optical collimator, and La is a distance from said optical collimator to the directivity regulating member.

4. The liquid-crystal display apparatus according to claim 1, wherein said optical collimator is disposed to close an opening of said housing.

5. A liquid-crystal display apparatus comprising:
  a liquid-crystal display panel; and
  an illuminating device including light sources, a housing of said light sources that has its inner surfaces covered with a diffuse reflecting layer, an optical collimator for collimating light issued from said light sources and the light reflected by the diffuse reflecting layer, and a directivity regulating member for regulating directivity of the collimated light emerging from said optical collimator.

6. The liquid-crystal display apparatus according to claim 5, wherein said directivity regulating member has a plurality of optical paths through which the light passes and anti-reflection layers that absorb the light incident on wall surfaces of said optical paths.

7. The liquid-crystal display apparatus according to claim 5, wherein the following relation is satisfied:

$$p/\tan \theta \leq La$$

where p is a pitch of emergence of the collimated light from said optical collimator, θ is a divergence angle of the collimated light emerging from said optical collimator, and La is a distance from said optical collimator to the directivity regulating member.

8. The liquid-crystal display apparatus according to claim 5, wherein the following relation is satisfied:

$$q/\tan \phi \leq Lb$$

where q is a pitch of emergence of the collimated light from said illuminating device, φ is a divergence angle of the collimated light emerging from said illuminating device, and Lb is a distance from said illuminating device to a liquid-crystal layer of the liquid-crystal display panel.

9. A liquid-crystal display apparatus comprising:
  a liquid-crystal display panel;
  an illuminating device including light sources, a housing of said light sources that has its inner surfaces covered with a diffuse reflecting layer, an optical collimator for collimating light issued from said light sources and the light reflected by the diffuse reflecting layer, and a directivity regulating member for regulating directivity of the collimated light emerging from said optical collimator; and
  a light diffusing plate for diffusing image-bearing light that has passed through said liquid-crystal display panel.

* * * * *